(12) United States Patent
Urklinski et al.

(10) Patent No.: US 12,493,945 B2
(45) Date of Patent: Dec. 9, 2025

(54) HOME INSPECTION SYSTEMS AND METHODS

(71) Applicants: FLIR Systems AB, Täby (SE); FLIR SYSTEMS, INC., Wilsonville, OR (US)

(72) Inventors: Erik Adam Urklinski, Täby (SE); Anton Lof, Täby (SE); Kristofer Vahlström, Täby (SE)

(73) Assignee: FLIR Systems AB, Taby (SE)

( * ) Notice: Subject to any disclaimer, the term of this patent is extended or adjusted under 35 U.S.C. 154(b) by 298 days.

(21) Appl. No.: 17/641,421

(22) PCT Filed: Sep. 10, 2020

(86) PCT No.: PCT/US2020/050267
§ 371 (c)(1),
(2) Date: Mar. 8, 2022

(87) PCT Pub. No.: WO2021/050784
PCT Pub. Date: Mar. 18, 2021

(65) Prior Publication Data
US 2022/0335596 A1   Oct. 20, 2022

Related U.S. Application Data

(60) Provisional application No. 62/899,074, filed on Sep. 11, 2019.

(51) Int. Cl.
*G06T 7/00* (2017.01)
*G01J 5/02* (2022.01)
*G01J 5/00* (2022.01)

(52) U.S. Cl.
CPC ............ *G06T 7/0008* (2013.01); *G01J 5/026* (2013.01); *G01J 5/027* (2013.01); *G01J 2005/0077* (2013.01); *G06T 2207/10048* (2013.01)

(58) Field of Classification Search
None
See application file for complete search history.

(56) References Cited

U.S. PATENT DOCUMENTS 4,884,696 A * 12/1989 Peleg ..................... B07C 5/342
209/912
5,637,871 A    6/1997 Piety et al.
(Continued)

FOREIGN PATENT DOCUMENTS

CN   105933663 A    9/2016
WO   WO 94/29701 A1   12/1994

OTHER PUBLICATIONS

Snap-On Incorporated, "Diagnostic Thermal Imager User Manual", 2016, 44 pages, United States of America.

*Primary Examiner* — Vikkram Bali
(74) *Attorney, Agent, or Firm* — Haynes and Boone, LLP

(57) ABSTRACT

System and methods for capturing infrared images for include infrared imaging components configured to capture infrared images of a scene, user input and output components include a display and at least one user input component, and a logic device configured to guide the user through an infrared image acquisition process to acquire an infrared image of an inspection area, and guide the user through an analysis of the captured infrared image to detect a condition visible in the infrared image of the inspection area. The user is guided through environmental and/or location considerations associated with the condition, instructed to prepare the location for infrared image acquisition, and guided through a process for analyzing captured images.

20 Claims, 15 Drawing Sheets

(56) References Cited

U.S. PATENT DOCUMENTS

| | | | |
|---|---|---|---|
| 6,078,874 A | 6/2000 | Piety et al. | |
| 6,324,532 B1 | 11/2001 | Spence et al. | |
| 7,262,747 B2 | 8/2007 | Ebersole et al. | |
| 8,374,438 B1* | 2/2013 | Wagner | H04N 5/33 |
| | | | 382/209 |
| 9,602,605 B2 | 3/2017 | Wang et al. | |
| 2016/0100764 A1* | 4/2016 | Teich | A61B 5/742 |
| | | | 348/77 |
| 2018/0027205 A1* | 1/2018 | Ruther | G01J 5/025 |
| | | | 348/164 |
| 2018/0053055 A1 | 2/2018 | Finding et al. | |
| 2018/0348143 A1 | 12/2018 | Ahlstrom et al. | |
| 2019/0094124 A1* | 3/2019 | Amer | G06N 3/045 |
| 2019/0191805 A1 | 6/2019 | Jiang et al. | |
| 2020/0007797 A1* | 1/2020 | Covington | G06V 10/143 |

\* cited by examiner

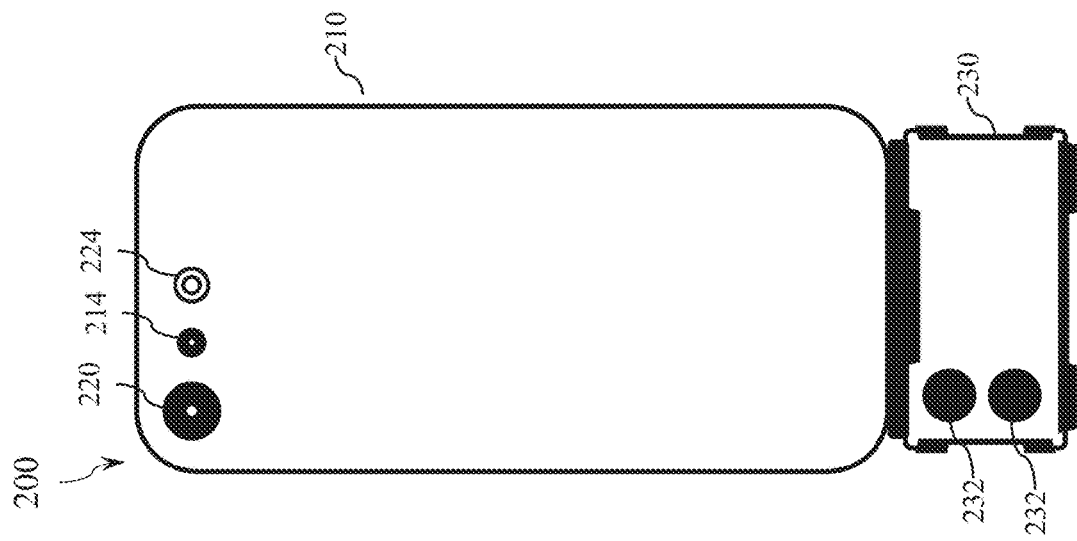
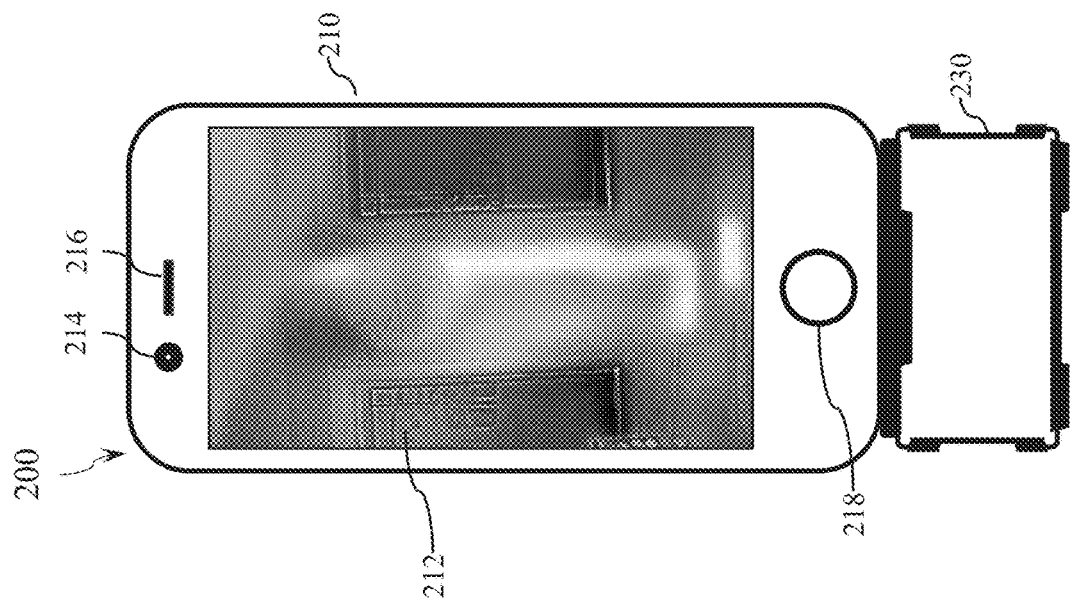

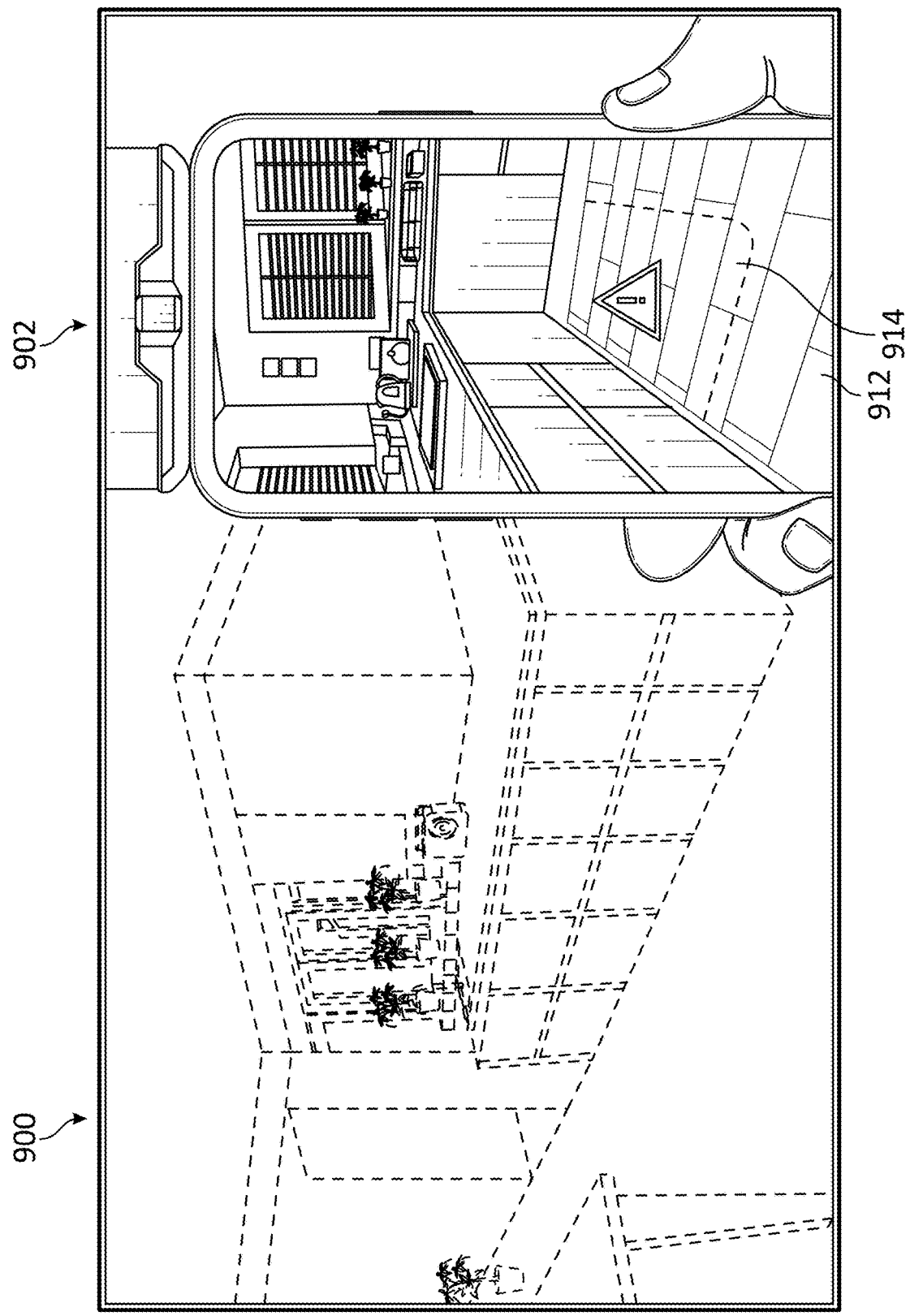

HOME INSPECTION SYSTEMS AND METHODS

CROSS-REFERENCE TO RELATED APPLICATIONS

This patent application is a U.S. National Stage Patent Application under 35 U.S.C. 371 of International Patent Application No. PCT/US2020/050267 filed Sep. 10, 2020 and entitled "HOME INSPECTION SYSTEMS AND METHODS," which claims priority to and benefit of U.S. Provisional Patent Application No. 62/899,074 filed Sep. 11, 2019 and entitled "HOME INSPECTION SYSTEMS AND METHODS," which are hereby incorporated by reference in their entirety.

TECHNICAL FIELD

One or more embodiments of the present disclosure relate generally to home inspection systems and methods, and more particularly for example, to infrared imaging-based home inspection systems and methods for non-skilled operators.

BACKGROUND

Various types of portable electronic devices, such as smart phones, tablet devices, digital cameras, portable computers, and other mobile devices are in widespread use. These devices typically include a visible-light image sensor or camera that allows users to take a still picture or a video clip. Image sensors used in these portable electronic devices are typically CCD-based or CMOS-based sensors limited to capturing visible light images. As such, these sensors can be used by operators of the mobile device without much training or skill. In contrast, infrared imaging, which produces images that may not be readily understood by an ordinary mobile device operator, has not been widely adopted for mobile devices.

In the field of image processing, there is an ongoing need for efficient and reliable ways to acquire, analyze, detect and classify infrared images. For many applications, a skilled operator is required to acquire the infrared images and interpret the results in order to solve a practical problem. A trained building inspector, for example, may be skilled in acquiring thermal images of a premises and analyzing the acquired thermal images to detect problem conditions such as air leakage. An untrained person, for example, may lack the knowledge and skill to acquire and interpret an infrared image and apply that interpretation to a real-world application.

In view of the foregoing, there is a continued need for improved systems and methods to enable an untrained person to acquire and analyze thermal images for use in practical applications.

SUMMARY

In various embodiments, systems and methods are provided for enhancing the experience of using an infrared camera by providing the user with step-by-step instructions and guidance to enable an untrained user to acquire high quality infrared images and interpret the acquired infrared imaged without requiring an understanding of infrared imaging and the physics of thermodynamics.

In various embodiments, a system includes infrared imaging components configured to capture infrared images of a scene, user input and output components comprising a display and at least one user input component, and a logic device configured to guide the user through an infrared image acquisition process to acquire an infrared image of an inspection area, and guide the user through an analysis of the captured infrared image to detect a condition visible in the infrared image of the inspection area.

The infrared image acquisition process may further include guiding the user through environmental and/or location considerations associated with the condition, instructing the user to prepare the location for infrared image acquisition, and guiding the user through a process for capturing an image for detection of the one or more conditions.

The analysis of the captured infrared image may further include rendering a display with the captured thermal image and at least one reference image, wherein the reference image illustrates a state of the one or more condition. The analysis of the captured infrared image may further include inputting the infrared image to a trained neural network configured to detect the one or more condition.

The system may further include visible imaging components configured to generate visible images of the scene, and the logic device may be further configured to render the visible image of the scene on the display, the visible image including an overlay representing an infrared image of a detected condition. The at least one condition may comprise detected water damage, and the logic device may be further configured to guide the user to capture infrared images over a period of time, detect water pool characteristics in two or more infrared images, and determine a dry up status based on a difference between the detected water pool characteristics. The overlay representing the infrared image of the detected condition may comprise a visualization of the water pool, including a visualize of the changes to the water pool over time. In various embodiments, the at least one condition may comprise a detected air leak at a window or door of a structure, detected missing insulation, detected water damage, and/or hidden defects in floor heating.

In various embodiments, a method includes guiding a user through an infrared image acquisition process to capture an infrared image of an inspection area, capturing at least one infrared image of the inspection area, guiding the user through an analysis of the captured infrared image to detect a condition visible in the infrared image of the inspection area, and receiving a determination of a presence or absence of the condition in the infrared image. The infrared image acquisition process performed in the method may further include guiding the user through environmental and/or location considerations associated with the condition, instructing the user to prepare the location for infrared image acquisition, and/or guiding the user through a process for capturing an image for detection of the one or more conditions.

The analysis of the captured infrared image performed in the method may further include rendering a display with the captured thermal image and at least one reference image, the reference image illustrating a state of the one or more condition, and/or inputting the infrared image to a trained neural network configured to detect the one or more condition.

The method may further include capturing a visible image of the scene and rendering the visible image of the scene on the display, the visible image including an overlay representing an infrared image of a detected condition. The least one condition may include detected water damage, and the method may further include guiding the user to capture infrared images over a period of time, detecting water pool characteristics in two or more infrared images, and determining a dry up status based on a difference between the detected water pool characteristics. The overlay representing the infrared image of the detected condition may comprise a visualization of the water pool, including a visualize of the changes to the water pool over time. In various embodiments, the at least one condition includes a detected air leak at a window or door of a structure, detected missing insulation, detected water damage, and/or hidden defects in floor heating.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 2A & 2B illustrate an example infrared imaging device, in accordance with one or more embodiments.

FIG. 9 illustrates an example floor heating defect interface, in accordance with one or more embodiments.

Embodiments of the disclosure and their advantages are best understood by referring to the detailed description that follows. It should be appreciated that like reference numerals are used to identify like elements illustrated in one or more of the figures.

DETAILED DESCRIPTION

Improved system and methods for infrared image acquisition and analysis are provided herein. In accordance with various embodiments, an untrained operator of a mobile device may acquire and analyze infrared images, detect one or more conditions in the infrared images, and apply the detected conditions to achieve a real-world result. For example, a house inspection application may be configured to guide an untrained user to prepare an environment, capture one or more images, detect one or more problems and/or damage from the images, and take an appropriate action. The home inspection application may be configured, for example, to detect air leakage through windows and/or doors, water damage, missing insulation, malfunctions in floor heating systems, and/or other problems. The solutions disclosed herein guide an untrained user, step-by-step, to inspect his/her own house without an education in or prior knowledge of infrared imaging.

In some aspects of the present disclosure, a mobile device is configured to execute an interactive mobile application that guides the user through the operation of an infrared camera to acquire one or more infrared images of a location. The mobile device is further configured to execute an interactive mobile application that guide the user through an analysis of the acquired infrared images to detect one or more conditions. Although many embodiments disclosed herein are directed to home inspection applications using a mobile device (e.g., a mobile phone with an attached infrared camera), it will be appreciated that the innovations disclosed herein may be implemented in other systems and/or directed to other infrared imaging applications.

Figure 1:
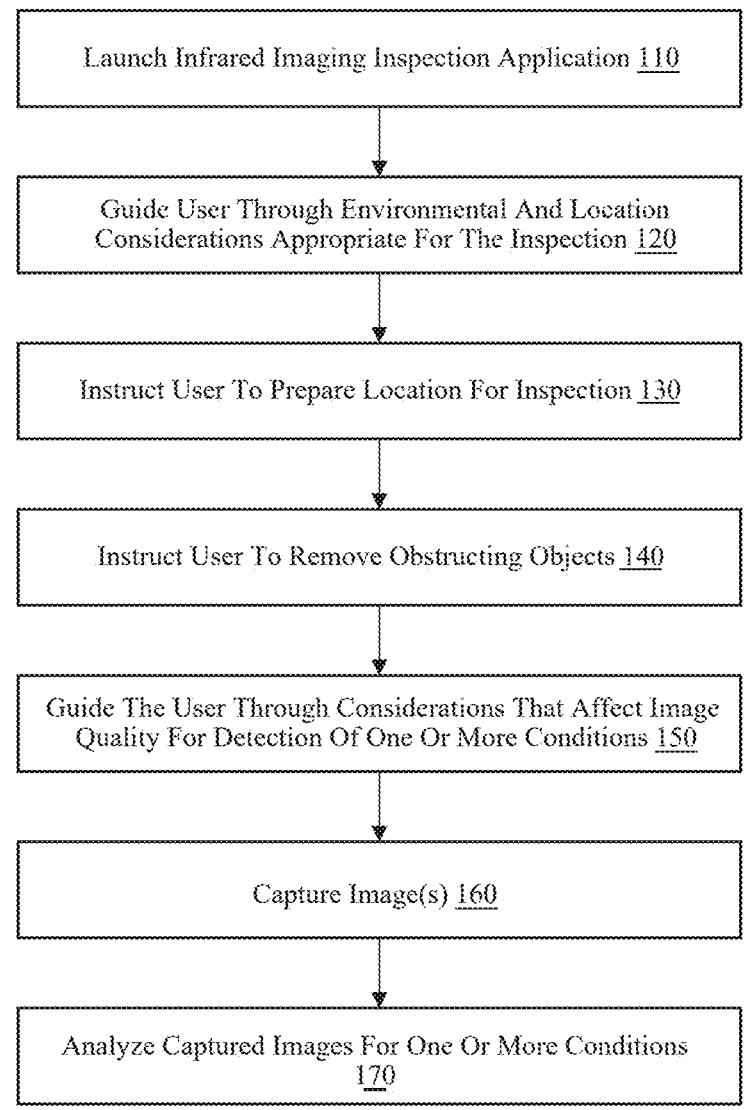
FIG. 1 illustrates an example infrared image capture and analysis process for use in a house inspection application, in accordance with one or more embodiments.

Referring to FIG. 1, a process 100 for inspecting a location using infrared imaging will now be described in accordance with one or more embodiments. The process 100 starts with the user launching an infrared imaging application from a mobile device at step 110. The infrared imaging application may be configured to guide the user through an inspection of a location using infrared imaging. The mobile device may include any device that includes and/or interacts with an infrared camera or other infrared imaging device. The mobile device may include, for example, a mobile phone, a tablet, a portable computer or other mobile computing system configured to perform the operations described herein. The mobile device may include a visible spectrum camera for capturing and displaying visible spectrum images and processing components for executing the mobile application. The mobile phone may further include an infrared camera including image capture components configured to detect and capture infrared spectrum images (e.g., thermal images) of a desired location. In some embodiments, mobile device is configured to capture both visible spectrum and infrared images of the same scene.

The infrared imaging application is configured to guide the user on a step-by-step basis through the acquisition and analysis of infrared images to address one or more conditions. The infrared imaging application provides step-by-step instructions for the user to prepare the physical area for evaluation, capture infrared images of the area and analyze the results. The infrared imaging application may present the user with reference images associated with various conditions for comparison with the acquired images. The infrared imaging application may further provide the user with associated educational information, hints, tips and guidance to aid the user's analysis of the captured infrared images to detect one or more underlying conditions associated with the inspection location. The infrared imaging application may further provide the user with context-specific information to further assist the user in detecting problems visible in an infrared image. For example, if the user is inspecting a location for possible air leakage, the infrared imaging application may direct the user to particular features where air leaks are likely to be found (e.g., windows or doors), display reference infrared images of air leaks for comparison against acquired images and provide other guidance associated with analysis of air leaks in infrared images.

In step 120, the infrared imaging application is configured to guide the user through environmental and location considerations appropriate for the inspection goals. The user may be instructed through text display, audio/video instruction, animations, images of example rooms, and/or through other media. For a home inspection application, for example, the user may be instructed to go inside the home for better thermal imaging results. The user may further be instructed to move into a particular room of the home associated with the desired condition to be inspected. Environmental factors that could affect the inspection results, such as outside temperature and indoor temperature, may also be explained to the user with guidance on improving the reliability of the inspection (e.g., consider conducting the inspection at night, changing the indoor temperature to achieve a larger temperature difference between the indoor and outdoor environments, etc.).

In step 130, the infrared imaging application instructs the user to prepare the location for inspection, which may include closing heating/air conditioning vents, closing windows and doors, running an air conditioning or heating system, and/or other user actions. In step 140, the infrared imaging application instructs the user to remove objects that may obstruct the scene to be thermally imaged. For example, various applications may involve taking an image of a wall, floor, ceiling, windows, vents and other household location. The accuracy of the thermal image analysis and detection of the problem by a user and/or an image processing system may be increased when a clear image of an unobstructed scene is acquired.

In step 150, the infrared imaging application guides the user through factors that affect image quality for detection of one or more conditions. For example, the user may be provided with instructions and tips for capturing high-quality infrared images of particular features (e.g., capture full window, avoid reflections, etc.) that will facilitate detection of one or more conditions (e.g., air leak, water damage, missing insulation, etc.) through visual inspection and/or automated processing of the captured infrared images. In step 160, the infrared imaging application instructs the user to capture one or more images of the scene from one or more camera positions/angles. In some embodiments, the mobile device includes both a visible light camera and an infrared camera and the infrared imaging application is configured to capture both visible light images and infrared images of the scene.

In step 170, the infrared imaging application facilitates an analysis of the captured images which may include the comparison of one or more captured images against one or more reference images. In some embodiments, the infrared imaging application displays a captured infrared image and one or more reference images that visually show potential problems to be detected. The user may not have experience analyzing an infrared image and/or detecting a particular problem in an infrared image. The infrared imaging application is configured to guide the user through a decision process that may include educating the user on what to look for in the image and providing comparison reference images of one or more conditions (e.g., image showing no problem, images showing one or more detected conditions, images guiding the user to look at a particular location of an image, etc.). In some embodiments, the captured images are processed through an expert system trained on a series of reference images and other criteria to automatically detect and classify a desired problem. The expert system may include an artificial intelligence system such as a trained neural network that is downloaded on the mobile device and/or a network-based server system configured to receive captured images, process the received images through the server-based expert system and return analysis results to the mobile device for display to the user.

The infrared mobile application may be further configured to provide the user with specialized views of the captured images and related data to augment the user's understanding of the conditions. For example, if infrared images and visible light images are both captured by the user, the infrared imaging application may display a visible light image for the user to give the user a familiar view of the location. Features extracted from the infrared image may be superimposed onto the visible light image (e.g., an area of air leakage) to illustrate the problem to the user in an easily understandable context. As another example, the infrared imaging application may be configured to compare a series of infrared images captured at different times (e.g., images captured on two or more days) to identify how a potential problem is changing over time (e.g., successive images of a pool of water may be processed to provide the user an estimate of when the water will be fully evaporated).

Additional aspects of the infrared imaging application facilitate sharing of captured images, detection results, user questions and other information with other users through a social networking platform. The community of users may further assist and guide other novice user through the inspection process. A network system may be configured to compile images, data, questions, solutions and other information from the mobile device and/or social networking platform to further enhance the guidance and image analysis. The shared images and data may be used to train artificial intelligence/deep learning features to analyze the captured images for more accurate detection of results and identify appropriate guidance for the user.

Referring to FIGS. 2A, 2B, 3 and 4, example implementations of an infrared imaging system will now be described in accordance with one or more embodiments. FIGS. 2A and 2B illustrate a mobile device 200 including a mobile phone 210 and an infrared imaging system 230. Although a mobile phone 210 is illustrated, it will be appreciated by persons having ordinary skill in the art that other mobile device implementations may include a tablet, a portable computer, a standalone mobile device, an infrared camera and/or other device or system that facilitates user input/output processing, infrared image capture and optionally visible image capture, and image processing disclosed herein.

The mobile phone 210 includes a touchscreen display 212 adapted to display information such as thermal images, visible light images and guidance to the user, and sense user input via touch commands received on the touchscreen display 212. The mobile phone 210 may further include one or more microphones 214 and speakers 216 allowing for audio input and output and one or more other controls 218. The mobile phone 210 may further include a visible light camera 220 and a light source 224 to facilitate the capture of visible light images. The infrared imaging system 230 is implemented as an attachment communicably coupled to the mobile phone 210 (e.g., through a USB connection, wireless connection, or via another wired/wireless communications protocol) and includes image capture components 232 that may include components for capturing one or more image types such as thermal imaging components, visible imaging components, and/or other imaging components.

Figure 3:
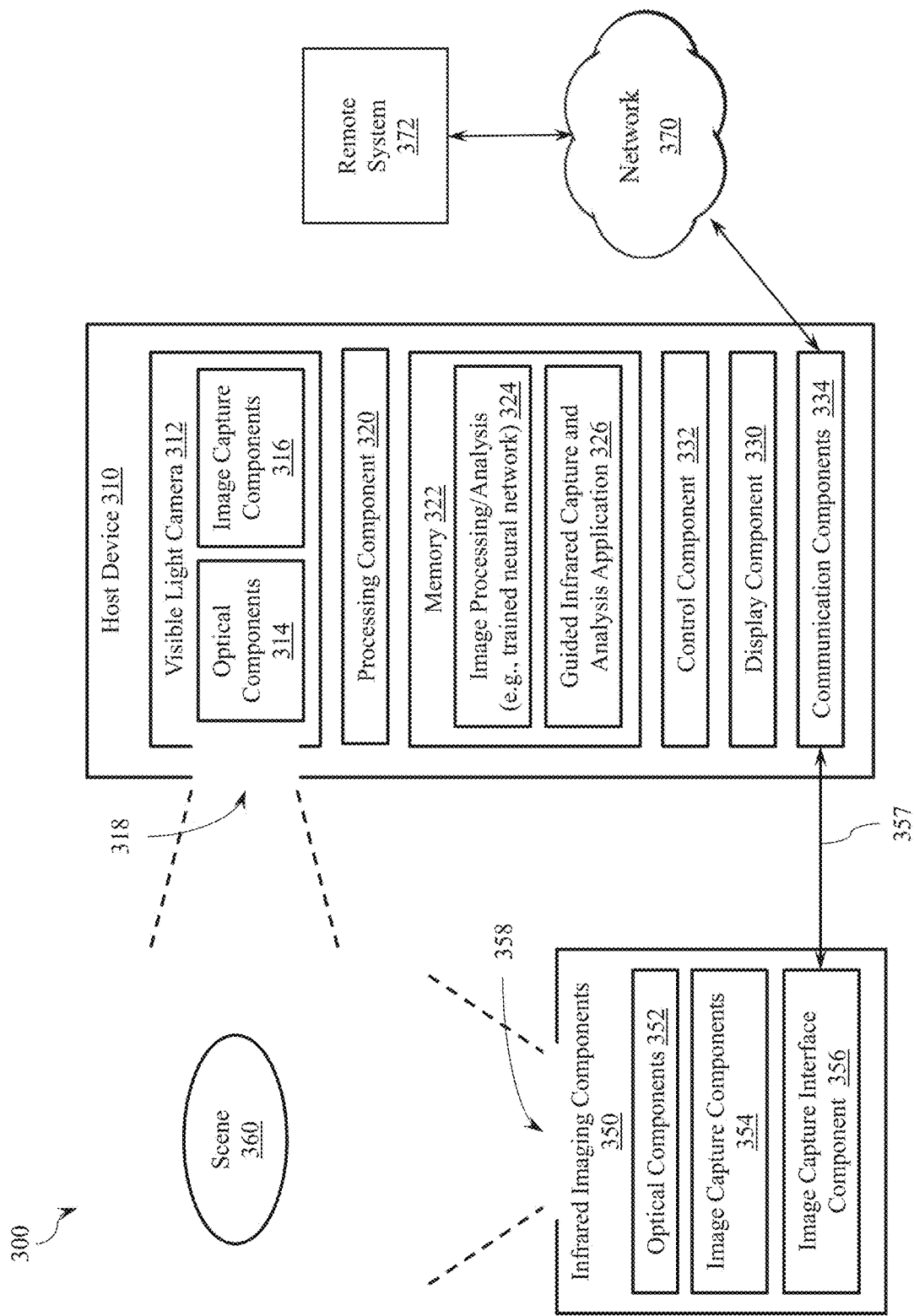
FIG. 3 illustrates an example infrared imaging system, in accordance with one or more embodiments.

Referring to FIG. 3, components of an example infrared image processing system 300 will now be described in accordance with one or more embodiments. In various implementations, the infrared image processing system 300 may include a mobile phone, tablet, personal computer, dedicated thermal imaging device, a thermal imaging attachment that communicably couples to a mobile device, and/or other systems, devices and components. In the illustrated embodiment, the infrared image processing system 300 includes a host device 310 and infrared imaging components 350. The host device 310 include a visible light camera 312, including optical components 314 and image capture components 316 for capturing an image of a scene 360 through an aperture 318. The optical components 314 may include one or more lenses configured to receive visible light reflected through the aperture 318 and pass the received visible light to image capture components 316.

The infrared imaging components 350 includes optical components 352 and image capture components 354 adapted to capture an infrared image of the scene 360 through an aperture 358. The optical components 352 may include one or more lenses configured to receive infrared radiation reflected through the aperture 358 and pass the received infrared radiation to image capture components 354. The infrared imaging components 350 further include an image capture interface component 356 adapted to communicate with the host device 310 across a communications link 357 (e.g., a system bus, a USB connection, a wireless interface, or other suitable connection). The infrared imaging components 350 may be implemented as any type of image capture system that is adapted to image the scene 360 and provide associated infrared image data to the host device 310, such as standalone thermal imaging camera, an attachment to a host device, imaging components integrated into the host device 310, and/or other components and devices.

In various embodiments, the infrared imaging system 300 may be implemented in standalone system that includes the host device 310 and integrated infrared imaging components 350 and/or may be arranged as a system that includes one or more physical devices (e.g., a mobile phone and a removable attachment that includes both infrared and visible light image capture components) and/or network systems (e.g., a remote system 372 such as a web server, cloud server, cloud storage system or other processing system communicably accessible through a network 370). Images captured from one or more components of host device 310 and/or infrared imaging components 350 may be processed on the host device 310 and/or transferred to the remote system 372 for further processing. In some applications, it may be desired to align the visible and infrared captured images for analysis, problem detection, display to the user (e.g., a visible image with infrared overlay), etc. In some embodiments, the visible light camera and infrared imaging components are arranged to generate image pairs of the same scene 360 that may be aligned by the host device 310 into a composite image. In some embodiments, a series of captured images may be combined into a single dataset to detect changes in the images over time, for use in 2D and/or 3D image registration, or for other processing tasks.

The host device 310 further includes a processing component 320, a memory 322, a display component 330, a control component 332, a communication component 334, and/or other components as appropriate for the implementation. Processing component 320 may include, for example, a microprocessor, a single-core processor, a multi-core processor, a microcontroller, a logic device (e.g., a programmable logic device configured to perform processing operations), a digital signal processing (DSP) device, one or more memories for storing executable instructions (e.g., software, firmware, or other instructions), a graphics processing unit and/or any other appropriate combination of processing device and/or memory to execute instructions to perform any of the various operations described herein. Processing component 320 is adapted to interface and the components of the host device 310 and the infrared imaging components 350 to perform method and processing steps as described herein. Processing component 320 may also be adapted to perform image processing (e.g., through an image processing and analysis component 324) which may include image pair registration (e.g., to align infrared and visible images), object detection and other analysis. In various embodiments, the processing component 320 may also be adapted to detect and classify objects, events or problems in the images captured by the infrared imaging components 350 and/or visible light camera 312.

The infrared image processing system 300 is configured to capture images of the scene 360 in cooperation with a user-guided, infrared capture and analysis application 326. It should be appreciated that processing operations and/or instructions may be integrated in software and/or hardware as part of processing component 320, or code (e.g., software or configuration data) which may be stored in memory 322. Embodiments of processing operations and/or instructions disclosed herein may be stored by a machine-readable medium in a non-transitory manner (e.g., a memory, a hard drive, a compact disk, a digital video disk, or a flash memory) to be executed by one or more computers (e.g., logic or processor-based system) to perform various methods disclosed herein.

Memory 322 may include one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, or other types of memory. In one embodiment, processing component 320 is adapted to execute software stored in memory 322 and/or a machine-readable medium to perform various methods, processes, and operations in a manner as described herein.

Image capture components 354 include one or more sensors for capturing image signals representative of an image of scene 360. The sensors of image capture components 354 provide for representing (e.g., converting) a captured infrared image signal of scene 360 as digital data (e.g., via an analog-to-digital converter included as part of the sensor or separate from the sensor as part of the infrared imaging components 350). In some embodiments, the image capture components 354 include infrared sensors (e.g., infrared detectors) implemented in an array or other fashion on a substrate. For example, in one embodiment, infrared sensors may be implemented as a focal plane array (FPA). Infrared sensors may be configured to detect infrared radiation (e.g., infrared energy) from a target scene including, for example, mid wave infrared wave bands (MWIR), long wave infrared wave bands (LWIR), and/or other thermal imaging bands as may be desired. Infrared sensors may be implemented, for example, as microbolometers or other types of thermal imaging infrared sensors arranged in any desired array pattern to provide a plurality of pixels. In some embodiments, the image capture components 354 also include visible spectrum sensors configured to detect visible spectrum radiation from the target scene 360.

Processing component 320 may be adapted to receive image signals from image capture components 354, process image signals (e.g., to provide processed image data), store image signals or image data in memory 322, and/or retrieve stored image signals from memory 322. Processing component 320 may be remotely positioned and adapted to remotely receive image signals from image capture components 354 via wired or wireless communication with image capture interface component 356, as described herein.

Display component 330 may include an image display device (e.g., a liquid crystal display (LCD)) or various other types of generally known video displays or monitors. Control component 332 may include, in various embodiments, a user input and/or interface device, such as a keyboard, a control panel unit, a graphical user interface, or other user input/output. Control component 332 may be adapted to be integrated as part of display component 330 to operate as both a user input device and a display device, such as, for example, a touch screen display adapted to receive input signals from a user touching different parts of the display screen.

Processing component 320 may be adapted to communicate with image capture interface component 356 (e.g., by receiving data and information from image capture component 354). Image capture interface component 356 may be configured to receive image signals (e.g., image frames) from image capture components 354 and communicate image signals to processing component 320 directly or through one or more wired or wireless communication components (e.g., represented by communications link 357) in the manner of communication component 334. In various embodiments, host device 310 and infrared imaging components 350 may be positioned proximate to each other, remote from each other, or integrated into a single device or system.

Communication components 334 may be include network interface components adapted for communication with the network 370 and may include one or more wired or wireless communication components. In various embodiments, the network 370 may include a single network or a combination of multiple networks, and may include a wired or wireless network, including a wireless local area network, a wide area network, the Internet, a cloud network service, and/or other appropriate types of communication networks. The host device 310 may be configured to operate in communication with one or more network systems, remote devices 372, computing devices, servers and/or one or more databases, and may be combined with other components. In some embodiments, host device 310 may send a series of captured images (e.g., visible and infrared image pairs) over network 370 (e.g., the Internet or the cloud) to remote device 372 for image processing and storage.

Figure 4:
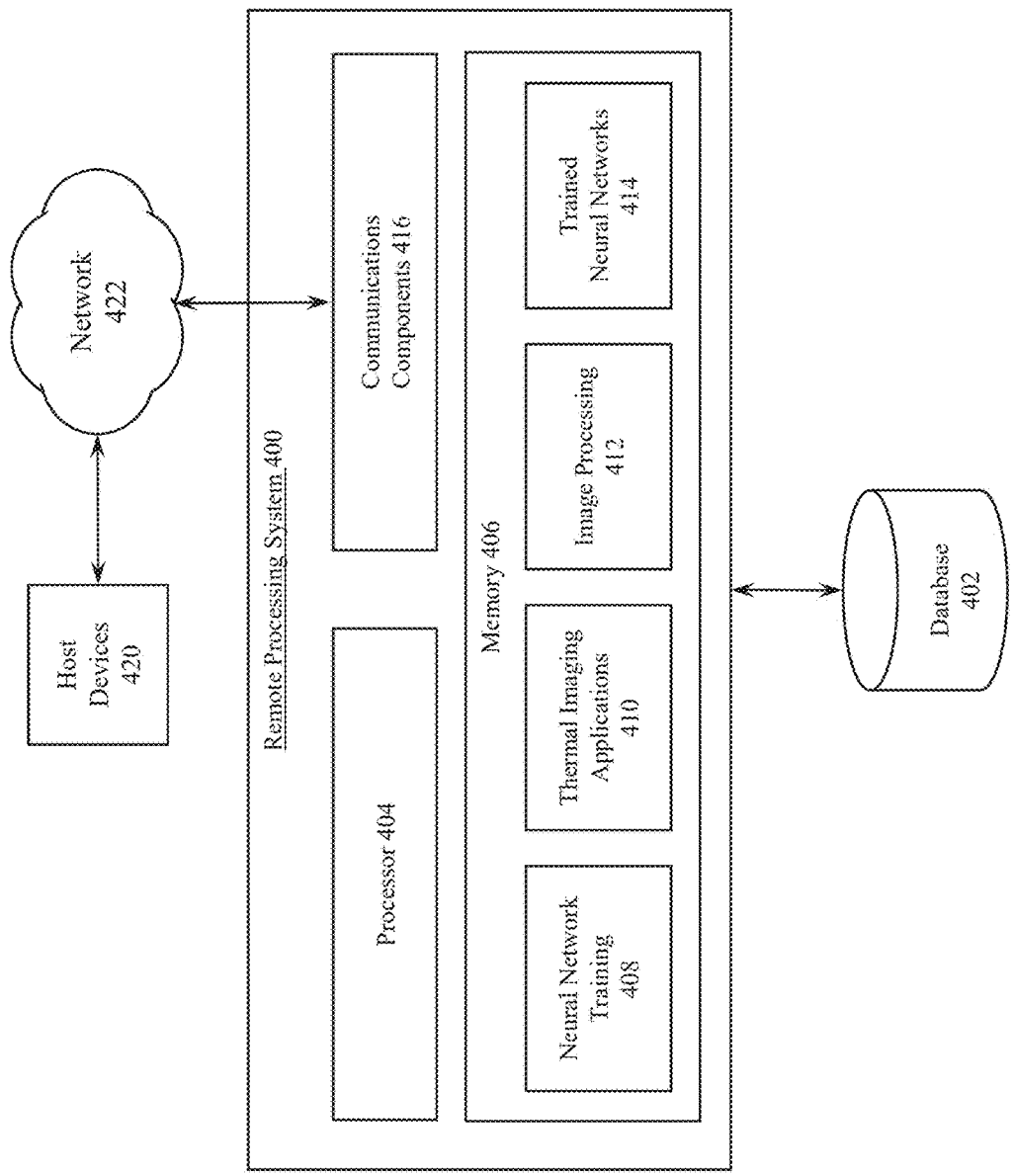
FIG. 4 illustrates an example networked infrared image processing system, in accordance with one or more embodiments.

An example embodiment of a remote processing system 400 will now be described with reference to FIG. 4. The remote processing system 400 may be implemented on one or more systems or servers such as an application server, cloud server, web server or other system that performs data processing and/or other software execution operations for generating, storing, classifying and retrieving images as described herein. In some embodiments, the components of the remote processing system 400 may be distributed across a communications network, such as communications network 422. The communications network 422 may include one or more local networks such as a wireless local area network (WLAN), wide area networks such as the Internet, and other wired or wireless communications paths suitable for facilitating communications between components as described herein. The remote processing system 400 may include communications components 416 configured to facilitate communications with one or more host devices 420 (e.g., the infrared image processing system of FIG. 3) over the communications network 422.

In various embodiments, the remote processing system 400 may operate in communication with one or more host devices 420 to provide image processing and analysis, to train expert system including neural networks for image processing and/or to configure the host device 420 with trained neural networks, user-guided infrared imaging applications, image storage and retrieval, and/or other services as may be appropriate for a particular implementation. The remote processing system 400 may be configured to receive one or more images (e.g., an image captured from an infrared camera and/or a visible light image) from one or more host devices 420 and other associated data (e.g., time, date, location, user identifier, host system identifier, problem for detection) and process associated problem identification/classification requests.

In the illustrated embodiment, the remote processing system 400 includes one or more processors 404 adapted to perform data processing and/or other software execution operations and a database 402 that stores data used by the system. The processor 404 may include logic devices, microcontrollers, processors, application specific integrated circuits (ASICs), field programmable gate arrays (FPGAs) or other devices that may be used by the remote processing system 400 to execute appropriate instructions, such as software instructions stored in memory 406, including neural network training component 408, thermal imaging applications 410, image processing components 412, trained neural networks 414, and/or other applications. The memory 406 may be implemented in one or more memory devices (e.g., memory components) that store executable instructions, data and information, including image data, video data, audio data, network information. In various embodiments, the remote processing system 400 may be configured to interface with various network devices, such as a desktop computer or network server, a mobile computing device such as a mobile phone, tablet, laptop computer or other computing device having communications circuitry (e.g., wireless communications circuitry or wired communications circuitry) for connecting with other devices in the remote processing system 400.

The communications components 416 may include logic and circuitry for communicating with other devices using various communications protocols. In various embodiments, communications components 416 may be configured to communicate over a wired communication link (e.g., through a network router, switch, hub, or other network devices) for wired communication purposes. For example, a wired link may be implemented with a power-line cable, a coaxial cable, a fiber-optic cable, or other appropriate cables or wires that support corresponding wired network technologies. Communications components 416 may be further configured to interface with a wired network and/or device via a wired communication component such as an Ethernet interface, a power-line modem, and/or other appropriate components for wired communication. Proprietary wired communication protocols and interfaces may also be supported by communications components 416.

Figure 5A:
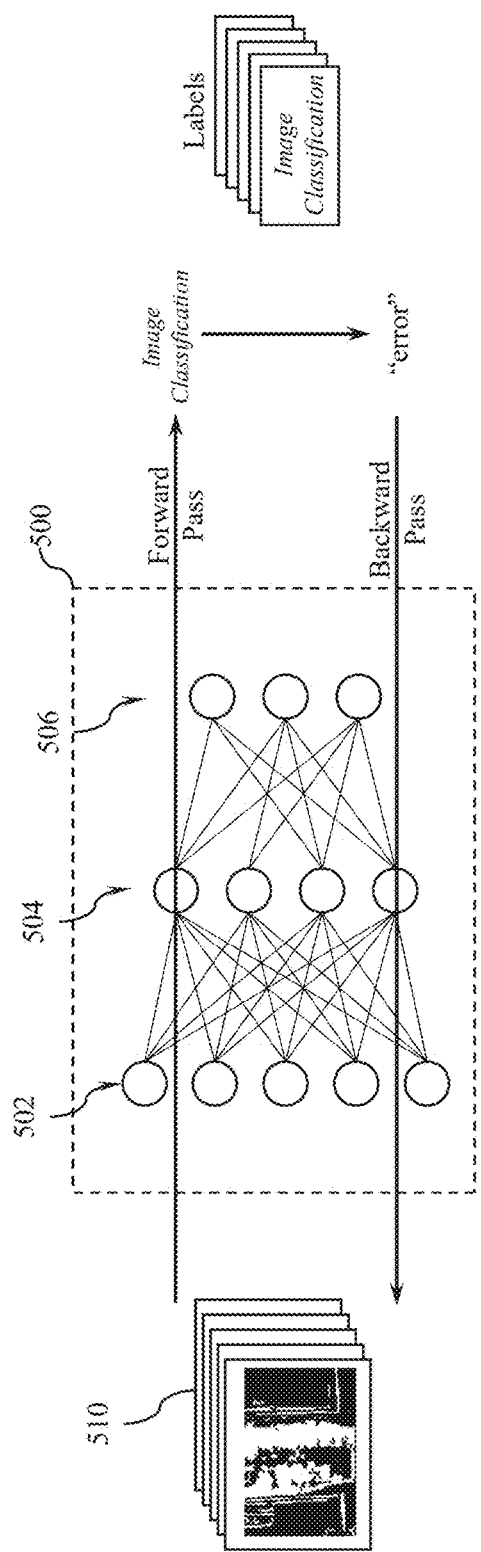
FIGS. 5A & 5B illustrate example neural networks, in accordance with one or more embodiments.
Figure 5B:
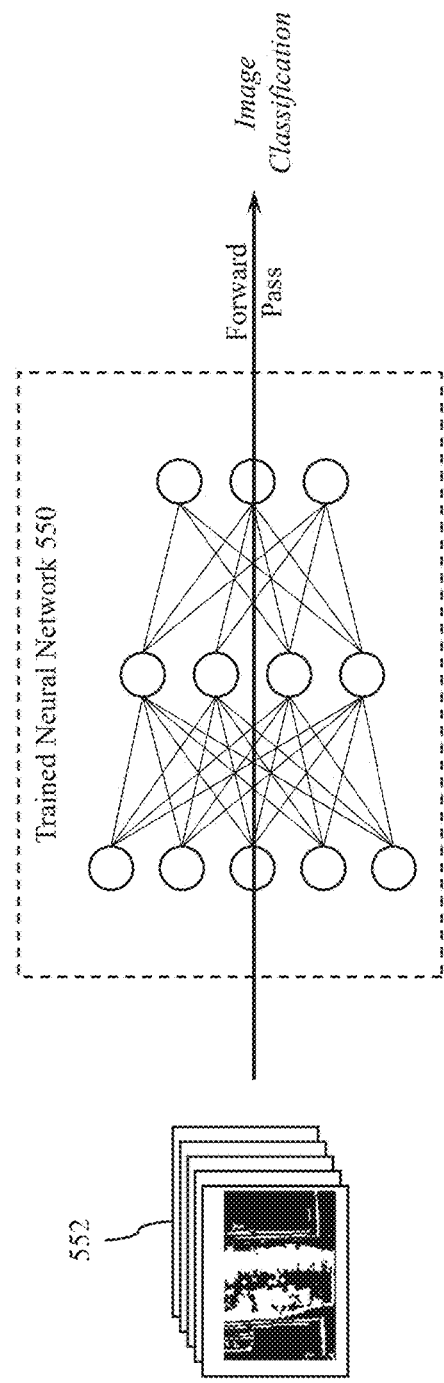

Referring to FIGS. 5A and 5B, an example neural network will now be described. FIG. 5A illustrates a training process for training a neural network 500 that may be implemented by the neural network training components 408 of the remote processing system. The neural network 500 includes at least one input layer 502, at least one hidden layer 504 and at least one output layer 506.

The neural network 500 receives a training dataset 510 comprising a series of labeled images representing images captured from an infrared image processing system and outputs an event classification for each image. The training dataset 510 may include images captured from an infrared, visible light, or other type of device that corresponds to host devices and/or other data input to the remote processing system. In some embodiments, the training dataset 510 includes one or more synthetically generated or modified images. The training dataset 510 may also include other image classification input data (e.g., the output of another trained neural network) that may be available to the system. For example, the training dataset 510 may include regions of interest in a captured image, an identification of the problem to be detected, user analysis or input, images received from host device 420 during operation, etc.

For problem detection and classification, the images may comprise a region of interest from a captured image that includes an area to be identified (e.g., a window, a door, a floor). In one embodiment, the training starts with a forward pass through the neural network 500 which may include feature extraction through a plurality of convolution layers and pooling layers, followed by image classification in a plurality of fully connected hidden layers and an output layer 506. Next, a backward pass through the neural network 500 may be used to update the weighting parameters for nodes of the neural network 500 to adjust for errors produced in the forward pass (e.g., misclassified images). In various embodiments, other types of neural networks and other training processes may be used in accordance with the present disclosure. Referring to FIG. 5B, a trained neural network 550 may then be implemented in a runtime environment on the remote processing system 400 (e.g., through trained neural networks 414) and/or downloaded to one or more host devices 420 for real-time or near real-time image analysis via the host device 420. In operation, the trained neural network 550 receives one or more infrared images 552 and outputs an image classification identifying whether an inspection condition was identified in the image. The runtime environment may include one or more implementations of the systems and methods disclosed herein.

Figure 6:
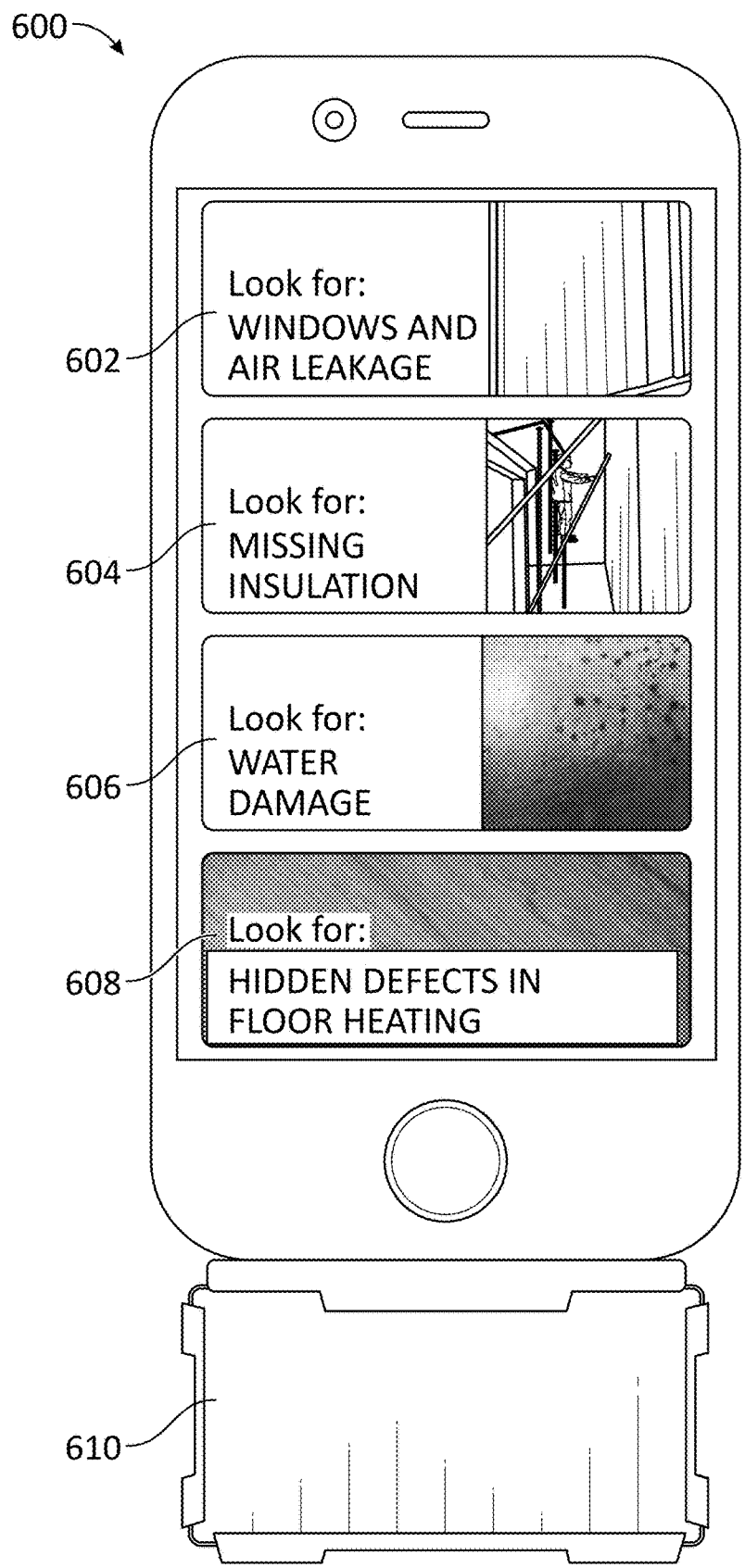
FIG. 6 illustrates an example user interface for a mobile infrared processing system, in accordance with one or more embodiments.

Example user interfaces and user-guided applications will now be described with reference to FIGS. 6-9. FIG. 6 illustrates an example application screen launched on a mobile device 600 that includes an attached infrared imaging system 610. The mobile device 600 is configured to render a graphical user interface including user-selectable menu options to launch a process to inspect a home for one or more condition. In the illustrated embodiment, the mobile device 600 is configured to guide the user through inspection processed to detecting window and air leakage 602, missing insulation 604, water damage 606 and/or hidden defects in floor heating 608. The user may select one of the available options to inspect the home for problems using images captured from the infrared imaging system 610.

Figure 7A:
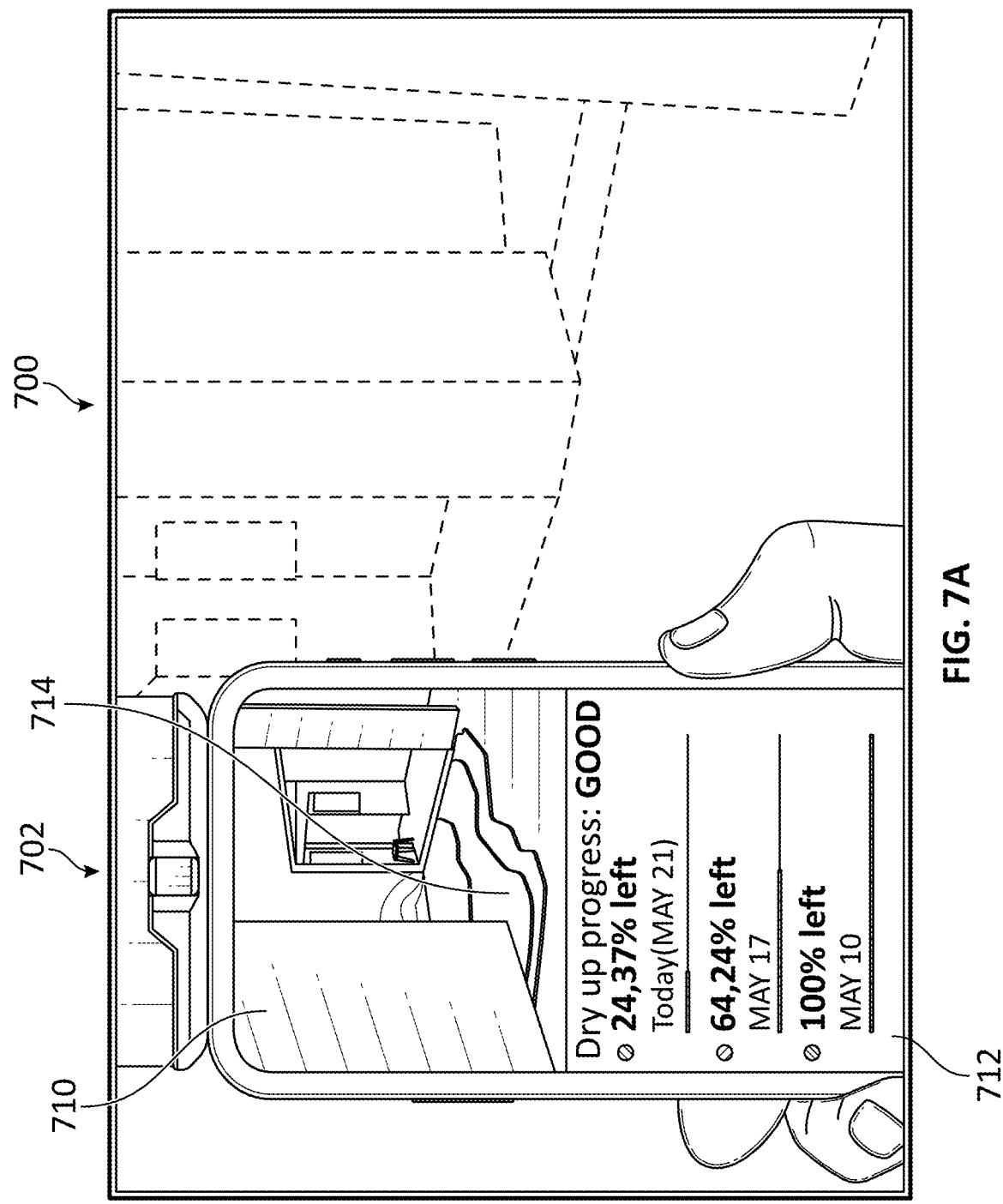
FIGS. 7A & 7B illustrate an example water damage detection application, in accordance with one or more embodiments.
Figure 7B:
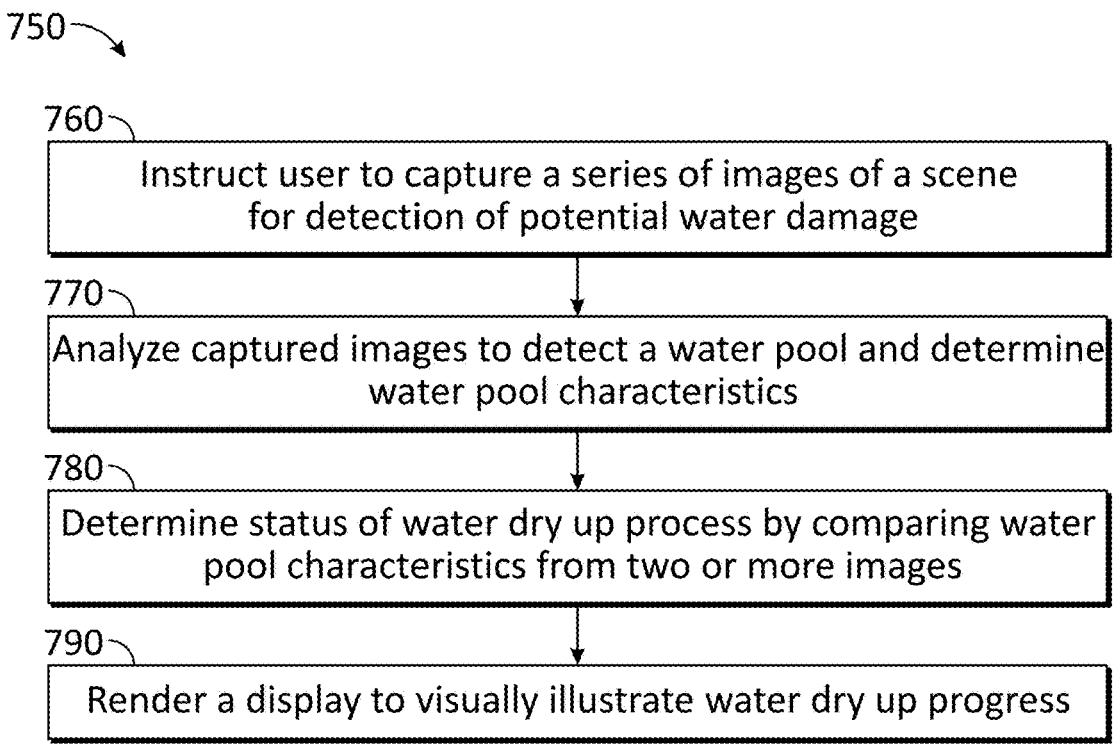

Referring to FIGS. 7A and 7B, an example water damage inspection process will now be described in accordance with one or more embodiments. The user of a mobile device may launch the water damage inspection process, for example, by selecting the appropriate menu option from an application (e.g., the application illustrated in FIG. 6) or by launching a standalone application. The user is guided through a process for acquiring thermal images of a scene 700 that may be used for visual inspection by the user and/or analysis by a processing system. In some embodiments, a mobile device 702 is configured with an application to guide the user through a process for preparing the scene and acquiring images (e.g., the process illustrated in FIG. 1), which may include a process 750 directed to inspection of water damage.

In step 760, the application guides the user to capture a series of image of the scene 700 for detection of water damage. The images may be captured over a suggested time period (e.g., every day) to track changes in the water pool. In step 770, the captured images are analyzed to detect a water pool and determine water pool characteristics, which may include determining a location and size of the water pool. In step 780, the application determines a status of the dry up process based on a comparison of water pool characteristics from two or more images. In some embodiments, the rate of water evaporation may be determined by comparing the change in water pool characteristics over the course of two or more measurements. The status information may user an estimate of when the water pool will be fully evaporated. In step 790, the application renders a display to visually illustrate the water dry up progress. In the illustrated embodiment, the display includes a visual image of the scene 710, status information 712 illustrating water dry up status over the course of more than one measurement (e.g., measurements taken on different days), and a thermal image overlay 714 illustrating the water pool detected in the captured thermal images. In one embodiment, the thermal image overlay 714 may show the water footprint on various measurement dates in an animated graphic, by overlaying the thermal images using different colors for the water pool acquired on each date, or through other visual representations.

Referring to FIGS. 8A-L, an example windows and air leakage inspection process will now be described in accordance with one or more embodiments. In some embodiments, the guided process of FIG. 1 may be used for guiding the user through the windows and air leakage inspection. The user may launch the windows and air leakage inspection process, for example, by selecting the appropriate menu option from an application (e.g. the application illustrated in FIG. 6) or by launching a standalone application. The user may be presented with a start screen 850, including tutorial information to inform the user of the nature the inspection process and an overview of the problems to be detected and resolved. After launching the application, the user is guided through a process for acquiring thermal images of a scene 800 that may be used for visual inspection by the user and/or analysis by a processing system to detect air leakage.

In some embodiments, a mobile device 802 is configured with an application to guide the user through a process to acquire images of the scene 800 and provide the user with feedback, comparison images and/or image analysis of potential problem areas. An example screen 830 illustrating a guided process is shown in FIG. 8C. The user may be guided through each step and/or the user may move directly to a step as desired (e.g., by contacting the step on a touchscreen display). The process may start, for example, by informing the user that a temperature difference above a threshold amount (e.g., 15 degrees) may improve the accuracy of the detection results, and guiding the user (e.g., through a screen 860) to take measures to improve the accuracy of the results (e.g., wait until nighttime, increase/decrease indoor temperature). The user may be provided with other tips and guidance as appropriate through a step-by-step process adapted to guide an inexperienced user through the inspection process. For example, the user may be instructed to use the thermal imaging device from inside the home (e.g., screen 870) and/or prepare the location for inspection by closing vents and turning on a fan to enhance the effect of air leaking into the house (e.g., screen 880). The user may be further guided to improve the quality of the captured image by removing obstructing objects that may obscure the view of the potential air leak (e.g., screen 882) and with thermal imaging tips such as reminding the user to avoid reflections and/or clarifying certain features that are likely to appear on the thermal image (e.g., screen 884) and instructing the user to capture an image of the full window (screen 890) or door to discover anomalies in the thermal image. As illustrated in FIG. 8I, the application may include interactive popup windows (e.g., 884a, 884b, 884c) that provide additional information to the user as needed.

Figure 8A:
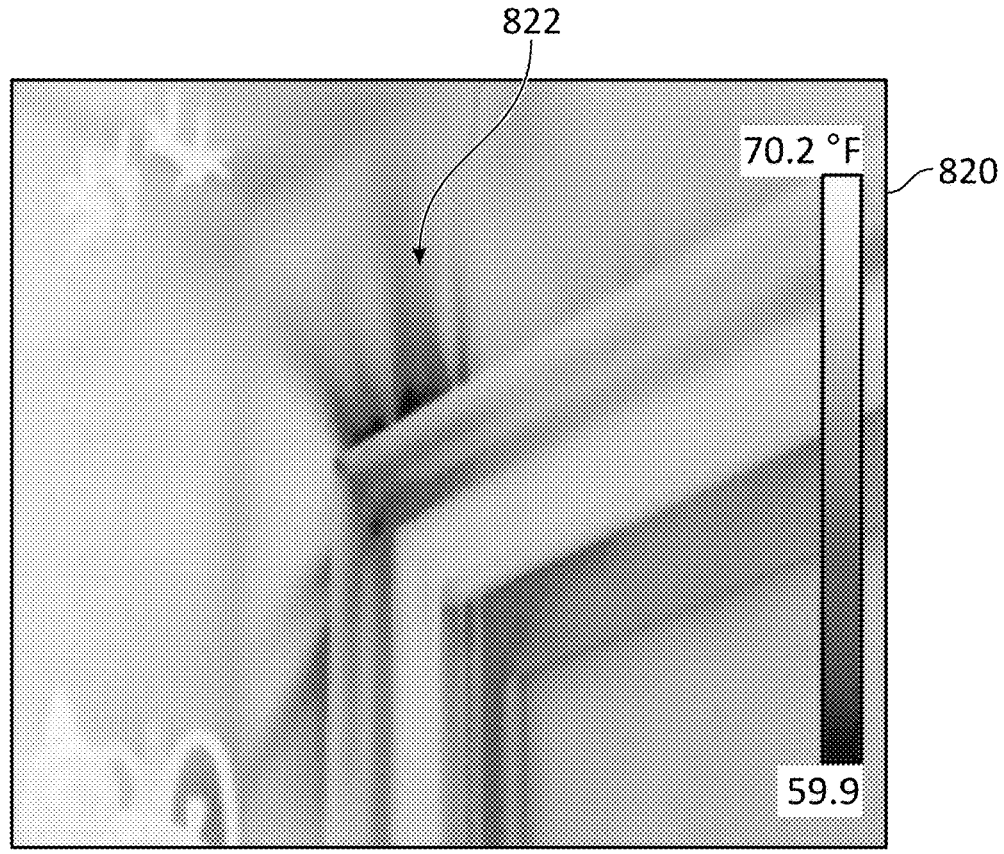
FIGS. 8A, 8B, 8C, 8D, 8E, 8F, 8G, 8H, 8I, 8J, 8K & 8L illustrate an example air leakage detection application, in accordance with one or more embodiments.
Figure 8B:
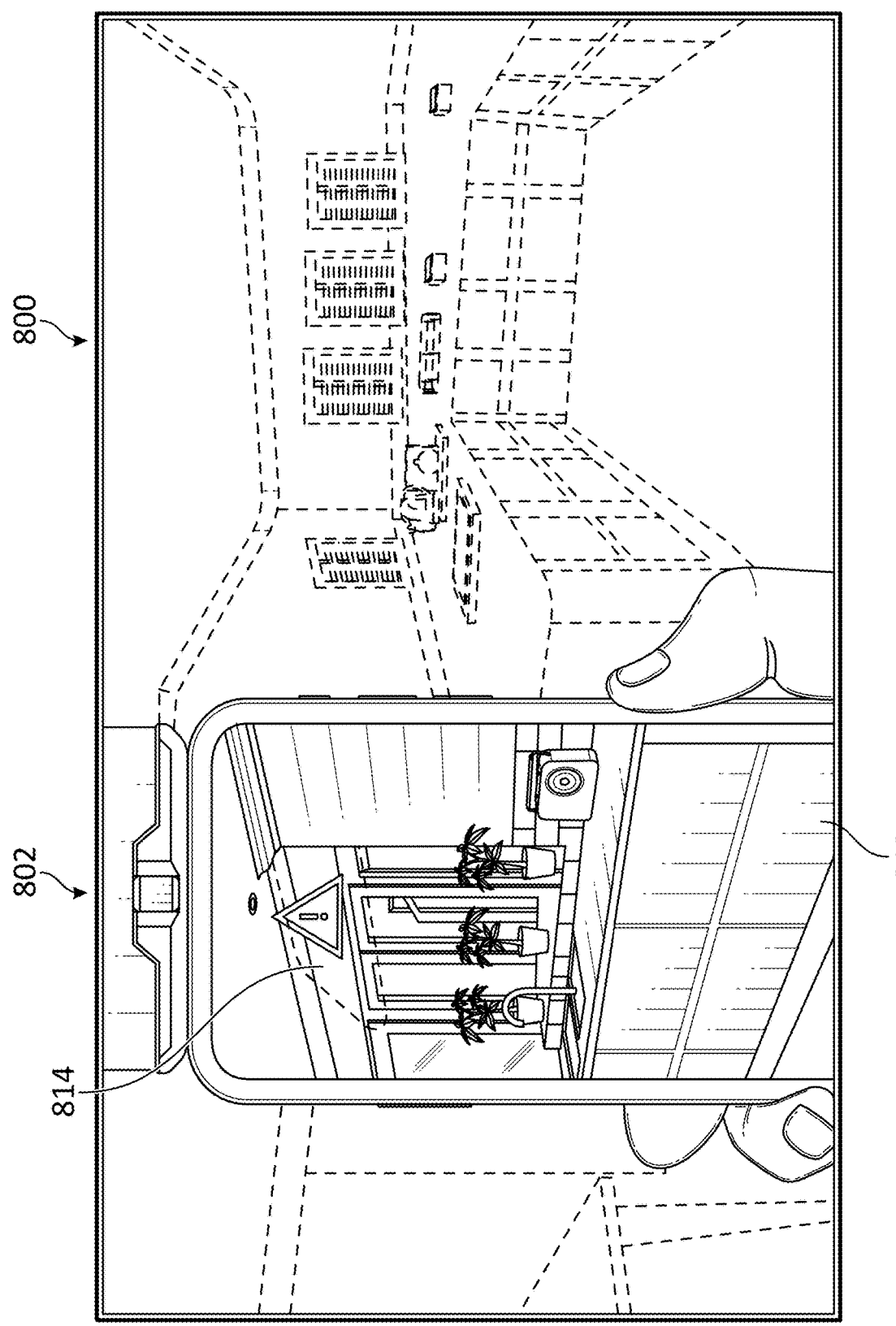
Figure 8E:
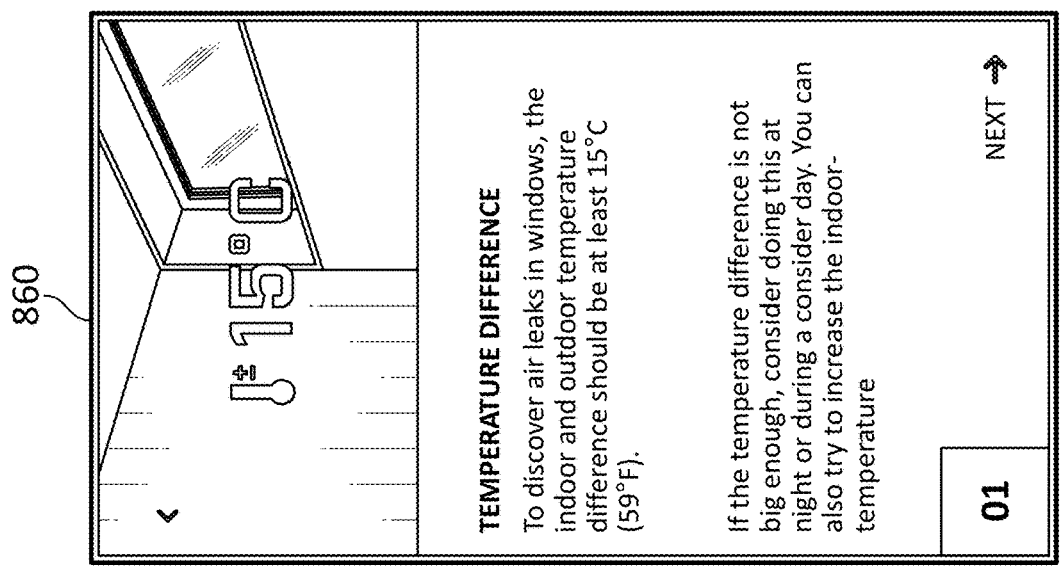
Figure 8D:
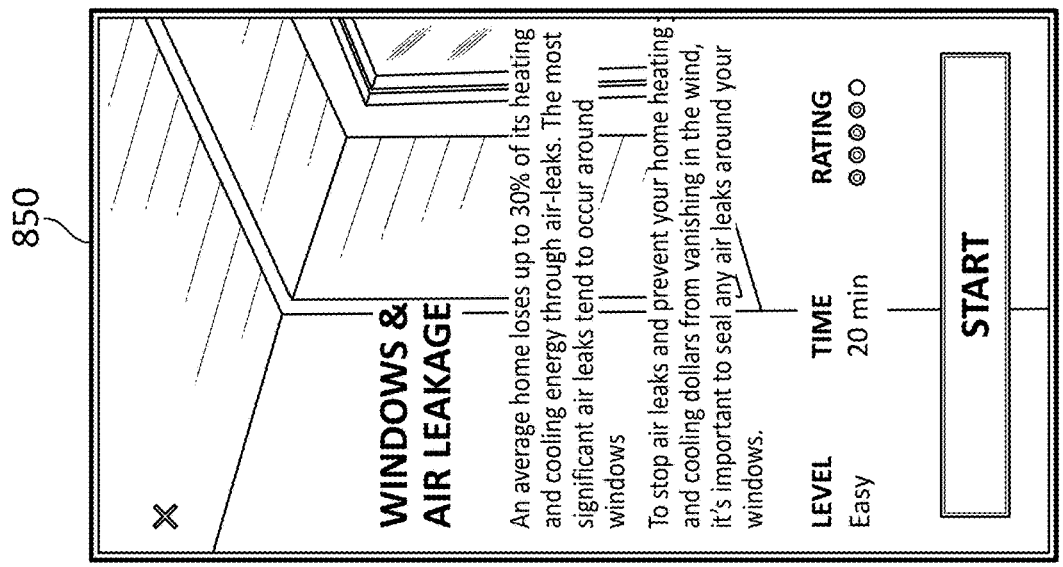
Figure 8C:
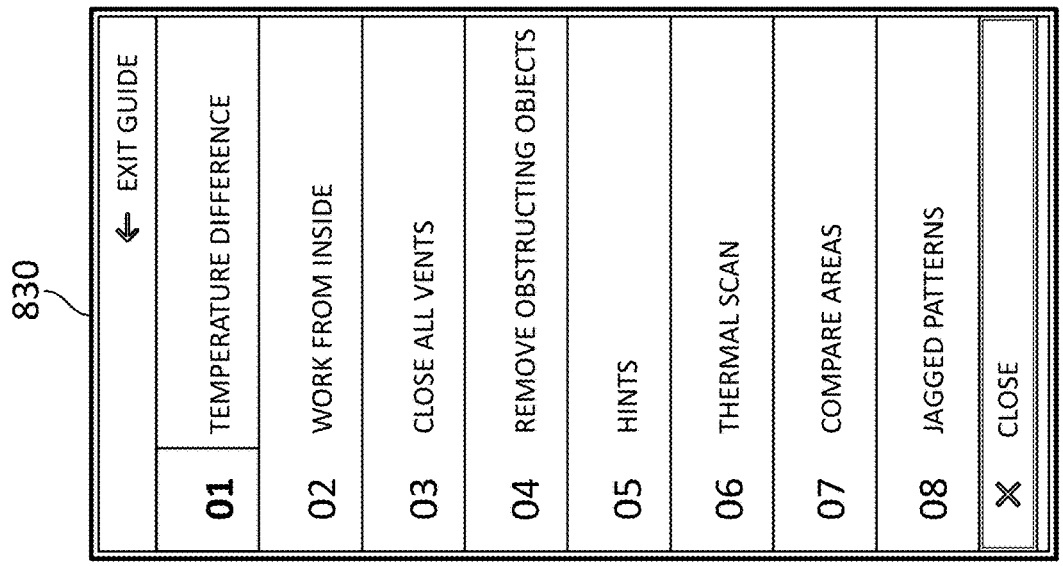
Figure 8H:
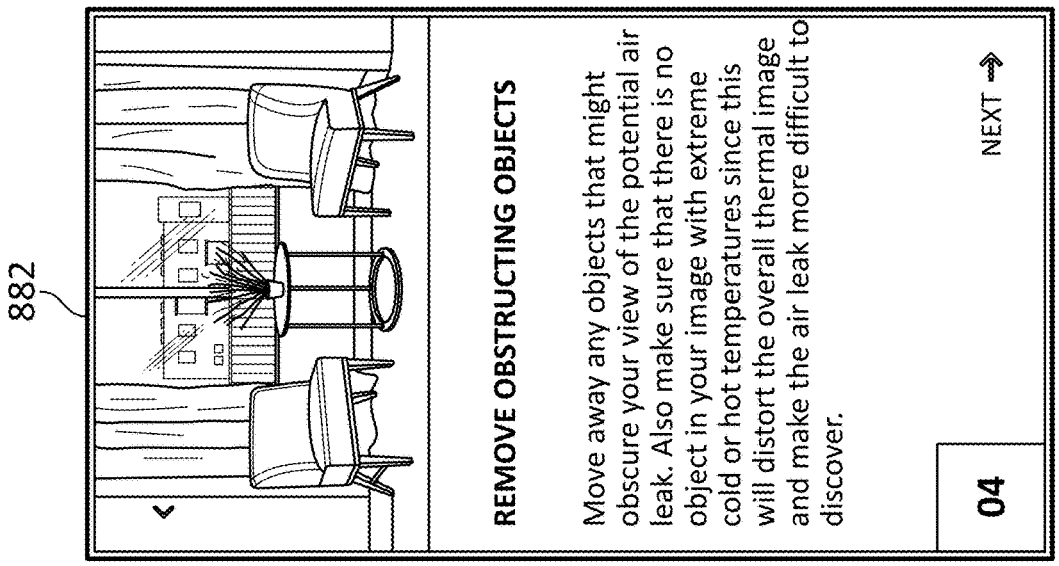
Figure 8G:
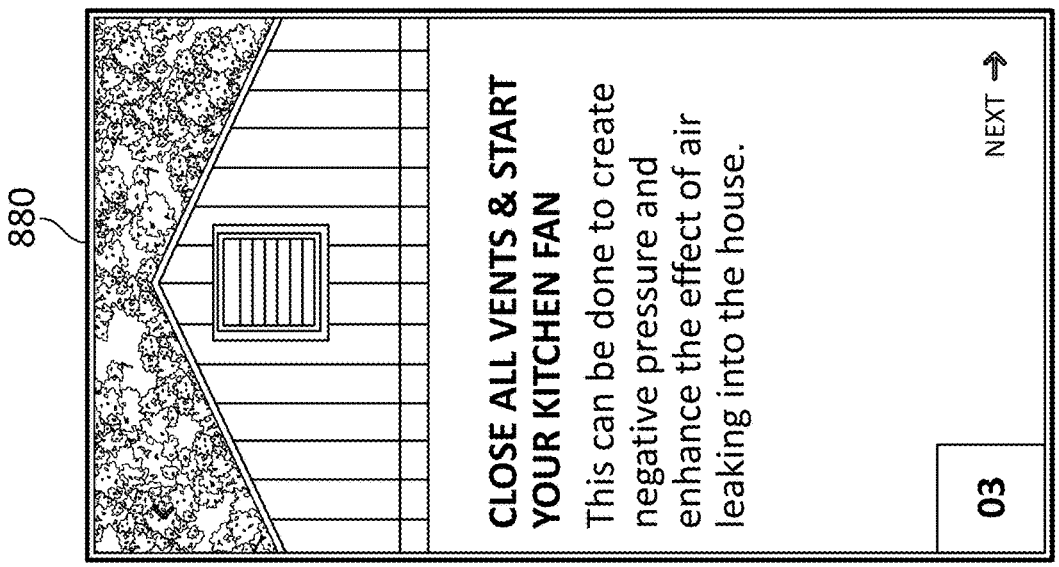
Figure 8F:
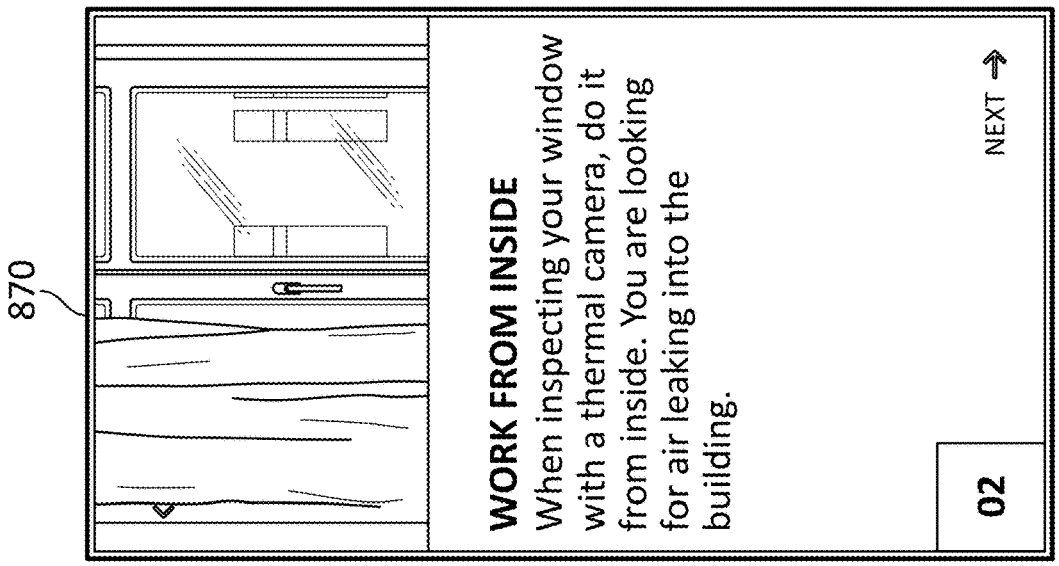
Figure 8I:
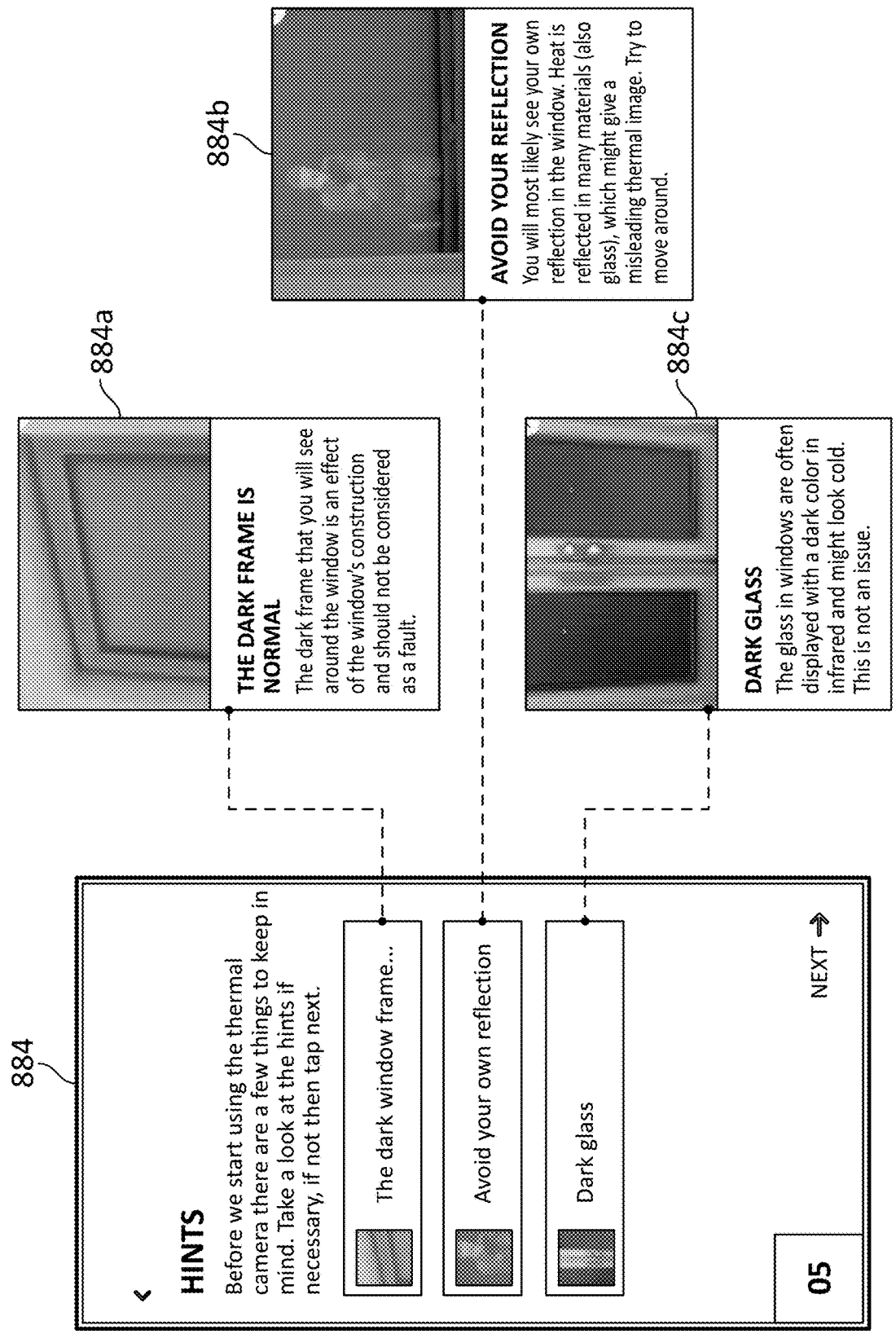
Figures 8J, 8K:
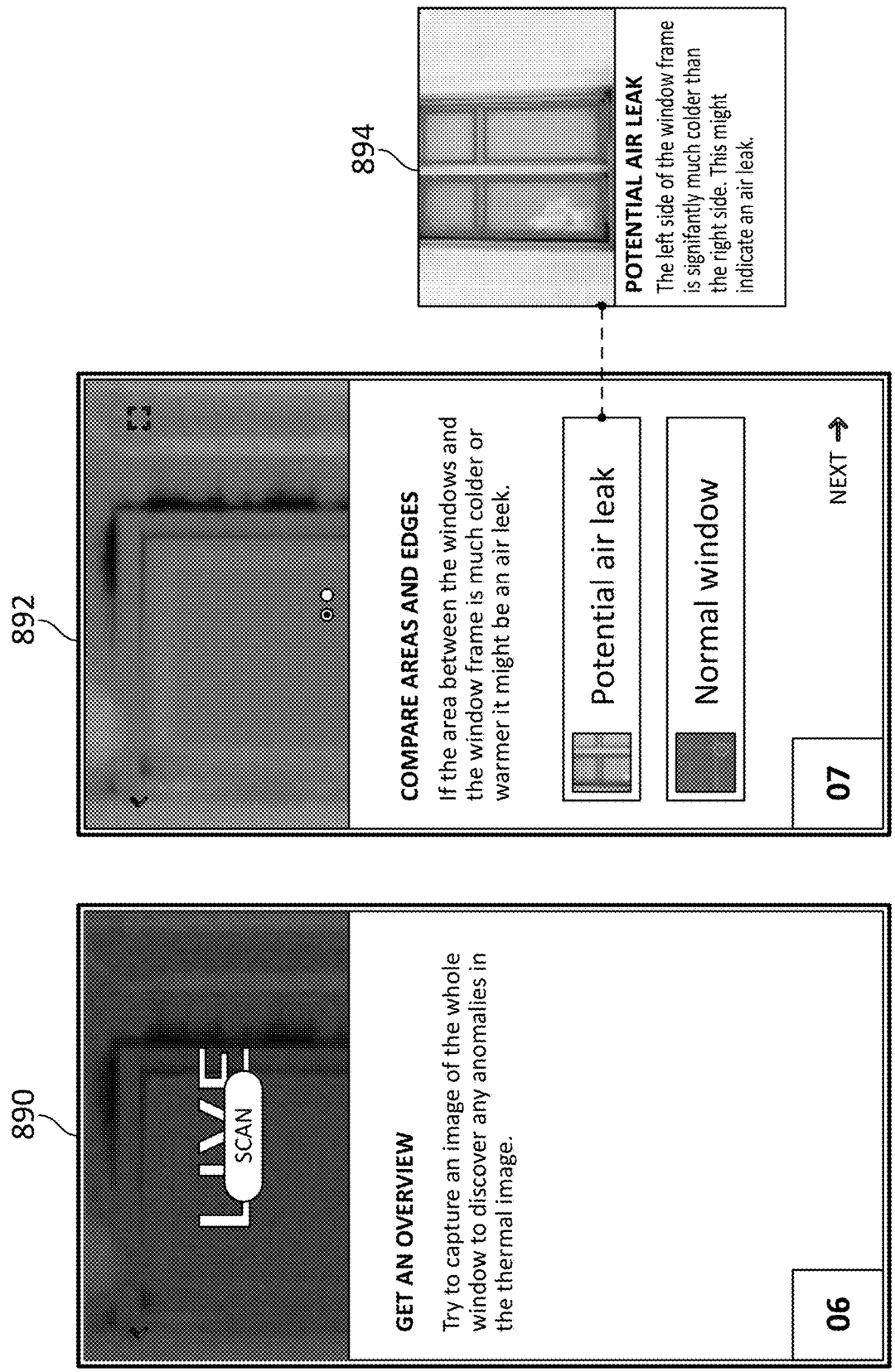
Figure 8L:
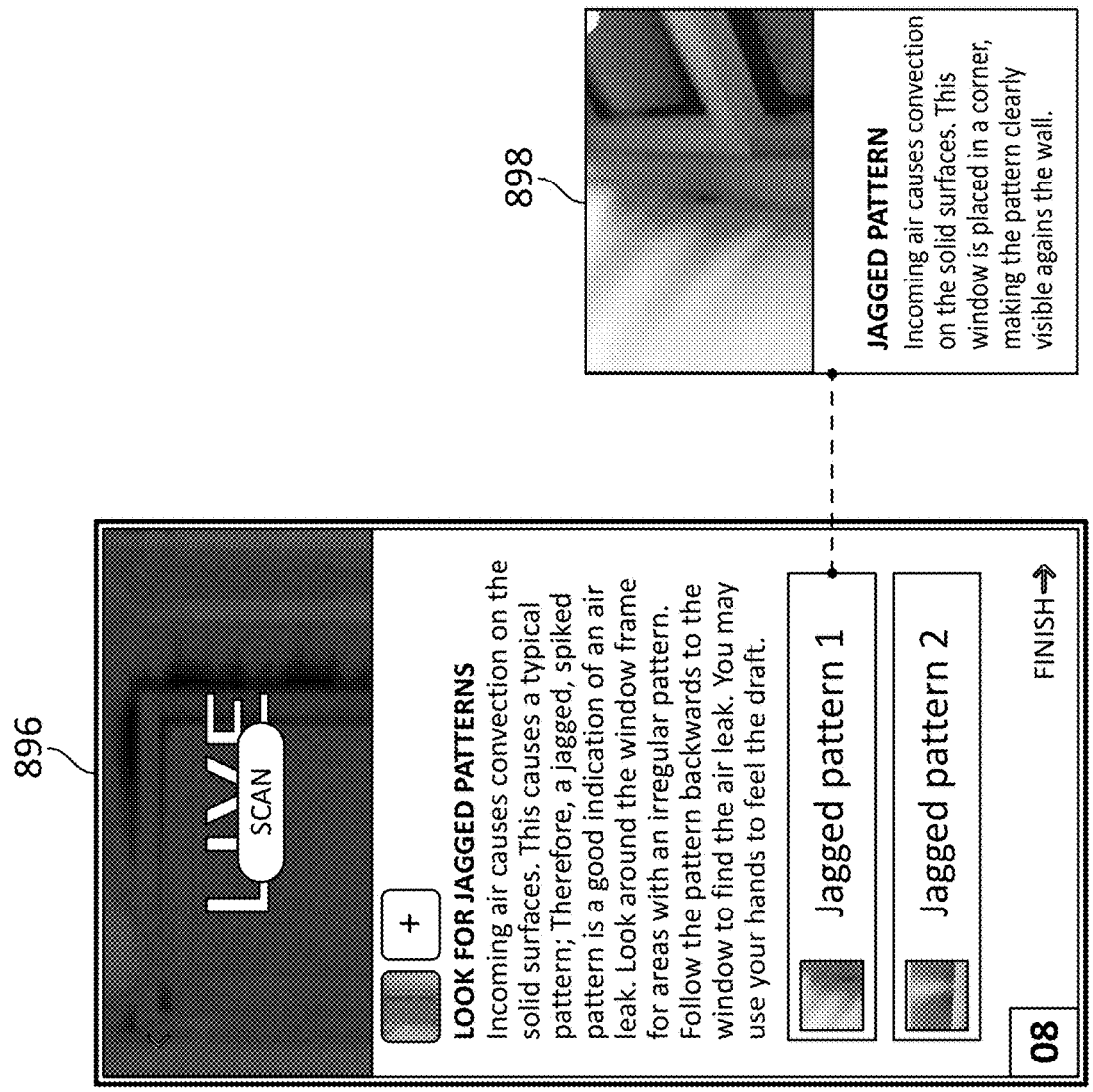

In some embodiments, as illustrated in FIG. 8B, the mobile device 802 is configured to display a visible spectrum image 812 of the scene with an overlay 814 illustrating potential problem areas detected through a visual (e.g., by the user) or automated (e.g., through image analysis) inspection of the infrared images. In various embodiments, the overlay 814 may include a representation of the problem area visible through the thermal image and/or a graphic or alert identifying the location and/or nature of the problem. The mobile device 802 may be configured to guide the user through a visual inspection of a thermal image (such as thermal image 820), which may include written or audio instructions on where air leakage problems are likely to occur and what the air leakage problems may look like on the image. For example, the presence of one or more cold spots 822 around a window or door frame may indicate air leaking in from outside at that spot.

The visual inspection may further include instructions on relevant areas of the image to consider and images of normal windows or doors and images with potential air leaks (e.g., screen 892) with further information and images available as needed by the user (e.g., screen 894). The system may further include side-by-side comparison of a captured thermal image 820 with one or more reference images, allowing the user to find a best match between the captured thermal image and one or more problem states. The user may also be instructed to look for certain patterns or other feature in the thermal image that indicate a problem, such as jagged patterns caused by air convection (e.g., screen 896 and screen 898). In some embodiments, an automated inspection of the thermal image 820 may include analysis of the captured image through an expert system, such as a neural network trained to receive thermal images and detect and classify one or more problems, such as air leakage.

Referring to FIG. 9, an example inspection process for detecting hidden defects in floor heating will be described in accordance with one or more embodiments. The user may launch the hidden defects in floor heating inspection process, for example, by selecting the appropriate menu option from an application (e.g. the application illustrated in FIG. 6) or by launching a standalone application. The user is guided through a process for acquiring thermal images of a scene 900 that may be used for visual inspection by the user and/or analysis by a processing system, such as through the guided process illustrated in FIG. 1. In some embodiments, a mobile device 902 is configured with an application to guide the user through a process to acquire images of the scene 900 and provide the user with feedback, comparison images and/or image analysis of potential floor heating defect areas.

In some embodiments, the mobile device 902 is configured to display a visible spectrum image 912 of the scene 900 (e.g., a kitchen) with an overlay 914 illustrating potential problem areas detected through a visual (e.g., by the user) or automated (e.g., through image analysis) inspection of the infrared images. In various embodiments, the overlay 914 may include a representation of the problem area visible through the thermal image and/or a graphic or alert identifying the location and/or nature of the problem. The mobile device 902 may be configured to guide the user through a visual inspection of a thermal image, which may include written or audio instructions on where hidden defects are likely to occur and what a hidden defect may look like on the thermal image. For example, a temperature difference in one or more areas of the floor may indicate a hidden defect at that spot. The visual inspection may further include a side-by-side comparison of a captured thermal image with one or more reference images, allowing the user to find a match between the captured thermal image and one or more problem states. In some embodiments, an automated inspection of the captured thermal image may include analysis of the captured image through an expert system, such as a neural network trained to receive thermal images and detect and classify one or more problems, such as hidden defects in the floor heating system.

In various embodiments, the application further includes a social community, where users can share images that have been captured with the assistance of the application. The social community allows users to share their findings and help others discover potential defects in their homes. By tracking user wisdom and collected images, the expert systems, artificial intelligence and deep learning system can stay updated on home issues affected users (e.g., allows the system to adapt to new construction materials and/or techniques, adapt to local weather conditions that are affecting local users, etc.). The trained system can assist with image processing, problem detection and classification and improve automatic image analysis in through the application.

As will be understood by persons having ordinary skill in the art, one benefit with the system and methods described herein is that an untrained person can operate a thermal imaging camera and interpret the thermal image without the need of a special education or any prior knowledge about thermodynamics. With the help of instructions, reference images and overlay graphics and other features disclosed herein the user receives relevant information about the images on the screen, enabling the user to make an informed decision. By helping the user make a decision on how to detect and treat their certain home problems, this systems and methods disclosed herein can increase energy savings, decrease unpredicted costs related to building damages and/or avoid dangerous or costly malfunctions in home appliances. Another benefit of this application is to lower the learning curve so that any person can utilize the features of thermal imaging.

The systems and methods disclosed herein enable a mobile device, such as a smart phone, to provide step-by-step instructions to an untrained user to capture and evaluate infrared images to identify specific problems. The mobile device application may provide example infrared image to the user with contextual information to aid in the user's evaluation of the infrared images. The mobile device application may provide augmented reality information to the user based on the captured infrared images (e.g., thermal overlay and/or alerts, graphics, text or other displayed information). The mobile device may further support sharing of captured infrared images with other users and local or remote artificial intelligence/deep learning processing to analyze the images. The mobile device may further be configured with an application providing step-by-step instructions for infrared capture and evaluation in combination with augmented reality information derived from the thermal images.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
   infrared imaging components configured to capture infrared images of a scene, the infrared imaging components comprising:
     first optical components; and
     image capture components comprising one or more infrared sensors for capturing image signals representative of an image of scene, wherein the first optical components are configured to receive infrared radiation and pass the received infrared radiation to the image capture components, wherein the image capture components are adapted to capture an infrared image of the scene;
   visible imaging components configured to generate visible light images of the scene, the visible imaging components comprising a visible light camera including:
     second optical components; and
     image capture components for capturing a visible light image of the scene, wherein the second optical components are configured to receive visible light and pass the received visible light to image capture components;
   user input and output components comprising a display and at least one user input component;
   a logic device; and
   a memory;
   wherein the logic device is configured to:
     guide the user through an image acquisition process to capture an infrared image of at least part of an inspection area and a visible light image of the inspection area, the process including identifying the inspection area within a location based on inspection goals and feedback from the user, wherein the image acquisition process comprises:
       using the infrared imaging components to capture the infrared image of at least part of the inspection area and store infrared image data in the memory; and
       using the visible imaging components to capture the visible light image of the inspection area and store the visible light image of the inspection area in the memory;
     analyze the captured infrared image to detect a condition visible in the infrared image of the inspection area;
     extract from the captured infrared image of at least part of the inspection area a feature illustrating the detected condition; and
     render an image of the scene on the display, the rendered image including the captured visible light image with an overlay representing the extracted feature superimposed on the visible light image to illustrate the detected condition.

2. The system of claim 1, wherein the logic device is configured to guide the user through the analysis of the captured infrared image via providing to the user a plurality of comparison reference images including:
   one or more first comparison reference images in which the condition is absent;
   one or more second comparison reference images the condition is present; and
   an explanation of how to detect the condition;
   wherein providing to the user the plurality of comparison reference images allows the user to compare the captured infrared image with the first and second comparison reference images to determine whether or not the captured infrared image includes the condition.

3. The system of claim 2, wherein the infrared image acquisition process further comprises guiding the user through environmental and/or location considerations associated with the condition.

4. The system of claim 3, wherein the infrared image acquisition process further comprises instructing the user to prepare the location for infrared image acquisition.

5. The system of claim 2, wherein the infrared image acquisition process further comprises guiding the user through a process for capturing an image for detection of the one or more conditions; and
   wherein each comparison reference image is provided to the user side-by-side with the captured infrared image.

6. The system of claim 2, wherein the logic device is further configured to share the captured infrared image, determination of a presence or absence of the condition in the infrared image and/or contextual information associated with the infrared image with a network system;
   wherein the network system is configured to store shared information, facilitate communication of shared information with other users, and/or utilize the shared information for training a neural network to classify the infrared image.

7. The system of claim 2, wherein the at least one condition comprises a detected air leak at a window or door of a structure, detected missing insulation, detected water damage, and/or hidden defects in floor heating.

8. The system of claim 1, wherein the analysis of the captured infrared image is performed by an expert system.

9. The system of claim 1, wherein the detected condition comprises detected water damage, and wherein the logic device is further configured to:
   guide the user to capture infrared images over a period of time;
   detect water pool characteristics in two or more infrared images;
   determine a dry up status based on a difference between the detected water pool characteristics.

10. The system of claim 9, wherein the overlay representing the feature extracted from the infrared image and superimposed on the visible image to illustrate the detected condition comprises a visualization of the water pool, including a visualization of the changes to the water pool over time.

11. A method comprising:
capturing an infrared image of a scene by infrared imaging components comprising:
- first optical components; and
- image capture components comprising one or more infrared sensors for capturing image signals representative of an image of scene, wherein the first optical components are configured to receive infrared radiation and pass the received infrared radiation to the image capture components, wherein the image capture components are adapted to capture the infrared image of the scene;

capturing a visible light image of the scene by visible imaging components comprising a visible light camera including:
- second optical components; and
- image capture components for capturing a visible light image of the scene, wherein the second optical components are configured to receive visible light and pass the received visible light to image capture components;

analyzing, by a logic device, the captured infrared image to detect a condition visible in the infrared image of the inspection area;

extracting, by the logic device from the captured infrared image of at least part of the inspection area, a feature illustrating the detected condition; and rendering, by the logic device, an image of the scene on a display, the rendered image including the captured visible light image with an overlay representing the extracted feature superimposed on the visible light image to illustrate the detected condition.

12. The method of claim 11, comprising guiding the user by the logic device through a computer-aided analysis of the captured infrared image to detect the condition visible in the infrared image of the inspection area;
wherein guiding the user through the analysis of the captured infrared image comprises providing to the user a plurality of comparison reference images including:
- one or more first comparison reference images in which the condition is absent; and
- one or more second comparison reference images the condition is present; and
- an explanation of how to detect the condition;
wherein providing to the user the plurality of comparison reference images allows the user to compare the captured infrared image with the first and second comparison reference images to determine whether or not the captured infrared image includes the condition.

13. The method of claim 12, wherein the infrared image acquisition process further comprises guiding the user through environmental and/or location considerations associated with the condition.

14. The method of claim 13, wherein the infrared image acquisition process further comprises instructing the user to prepare the location for infrared image acquisition.

15. The method of claim 12, wherein the infrared image acquisition process further comprises guiding the user through a process for capturing an image for detection of the one or more conditions; and
wherein each comparison reference image is provided to the user side-by-side with the captured infrared image.

16. The method of claim 12, wherein the method further comprises sharing the captured infrared image, determination of a presence or absence of the condition in the infrared image and/or contextual information associated with the infrared image with a network system;
wherein the network system is configured to store shared information, facilitate communication of shared information with other users, and/or utilize the shared information for training a neural network to classify the infrared image.

17. The method of claim 12, wherein the at least one condition comprises a detected air leak at a window or door of a structure, detected missing insulation, detected water damage, and/or hidden defects in floor heating.

18. The method of claim 11, wherein the analysis of the captured infrared image is performed by an expert system.

19. The method of claim 11, wherein the detected condition comprises detected water damage, and wherein method further comprises:
- guiding the user to capture infrared images over a period of time;
- detecting water pool characteristics in two or more infrared images;
- determining a dry up status based on a difference between the detected water pool characteristics.

20. The method of claim 19, wherein the overlay representing the feature extracted from the infrared image and superimposed on the visible image to illustrate the detected condition comprises a visualization of the water pool, including a visualization of the changes to the water pool over time.

* * * * *

UNITED STATES PATENT AND TRADEMARK OFFICE
CERTIFICATE OF CORRECTION

| | | |
|---|---|---|
| PATENT NO. | : 12,493,945 B2 | Page 1 of 1 |
| APPLICATION NO. | : 17/641421 | |
| DATED | : December 9, 2025 | |
| INVENTOR(S) | : Erik Adam Urklinski, Anton Lof and Kristofer Vahlström | |

It is certified that error appears in the above-identified patent and that said Letters Patent is hereby corrected as shown below:

In the Specification

Column 12, Line 66, change "As illustrated in FIG. 81" to --As illustrated in FIG. 8I--.

Signed and Sealed this
Twenty-seventh Day of January, 2026

John A. Squires
*Director of the United States Patent and Trademark Office*